March 3, 1970    N. PEACOCK    3,498,252
PNEUMATIC BOAT FENDER
Filed Sept. 11, 1968
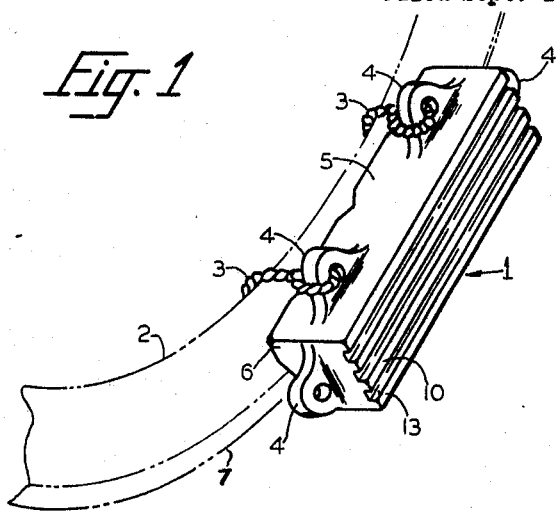
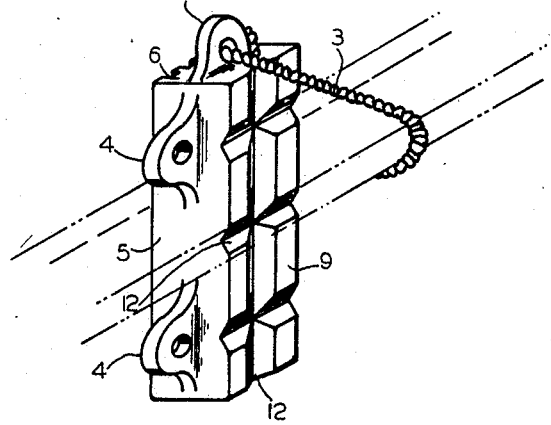
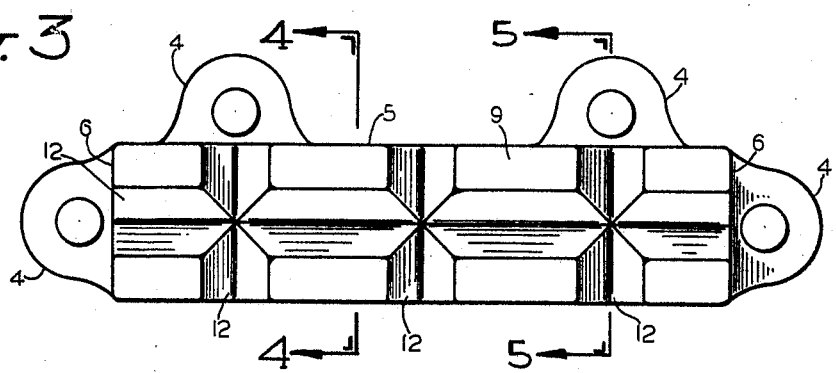
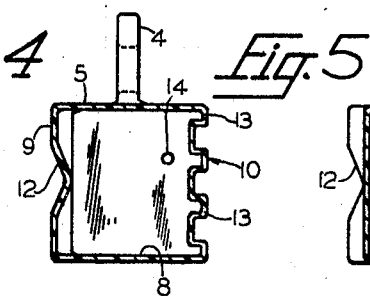 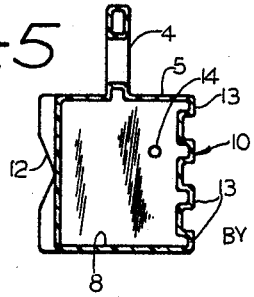
INVENTOR
NEIL PEACOCK
BY DONALD E. PORTER
ATTORNEY United States Patent Office 3,498,252
Patented Mar. 3, 1970

3,498,252
PNEUMATIC BOAT FENDER
Neil Peacock, 4441 S. 12th St.,
Sheboygan, Wis. 53081
Filed Sept. 11, 1968, Ser. No. 758,979
Int. Cl. B63b 59/02
U.S. Cl. 114—219
6 Claims

ABSTRACT OF THE DISCLOSURE

A pneumatic fender for boats comprising a tubular, elongated body having two rectangular ends and four, generally rectangular sidewalls, one sidewall including ribs extending the length thereof and the opposite sidewall including longitudinal and transverse V-grooves for partially surrounding the gunwale of the boat to prevent the fender from slipping up and over the gunwale, and upstanding integral lugs formed in the end walls and one sidewall of the fender for attaching it to a boat.

---

This invention is directed to a pneumatic fender comprising an elongated, tubular molded body having two generally square end walls and four generally rectangular elongated sidewalls. One of the sidewalls has longitudinal ribs formed in its exterior surface, and the opposite sidewall has longitudinal and transverse V-grooves cast therein. A fender thereby is provided which may be attached to a boat in a position in which a V-groove partially surrounds the gunwale of the boat to keep the fender in place and prevent its slipping up over the gunwale as the boat rocks in the water. The ribs on the opposite sidewall are disposed in relatively nonfrictional engagement with the pilings of the mooring pier, and tend to keep the fender in place relative to the boat's gunwale.

Pneumatic fenders are well known to small craft sailors. United States Patent No. 3,183,875 issued May 18, 1965, to Linus E. Russell shows a tubular boat bumper which is an elongated, generally rectangular shape having square end walls. The walls are resilient, and are preferably formed of a plastic material, with interconnecting edges and corners having a slightly rounded contour. When inflated, the device provides a light weight, impact-resistant bumper, but with smooth sidewalls. A boat bumper having smooth sidewalls tends to ride up and over the gunwale of the boat as it rocks in the water and the bumper strikes the pier or other structure to which the boat is moored. The wet, slippery sidewall of the bumper does not prevent the bumper from riding up the pilings of the mooring pier as the boat rocks in the waves, and the bumper tends to lose contact so the boat's freeboard is unprotected from damaging impacts with the pier.

The best mode presently contemplated of carrying out the invention is illustrated in the accompanying drawings, in which:

FIGURE 1 is a perspective view of a fender embodying the present invention, mounted on a boat in a position in which the longitudinal V-groove on the sidewall of the fender partially surrounds the outer edge of the boat's gunwale;

FIGURE 2 is a perspective view of the fender shown in FIGURE 1, mounted on a boat, and changed in position so that one of the transverse V-grooves on the sidewall of the fender partially surrounds the gunwale of the boat;

FIGURE 3 is a plan view of the fender shown in FIGURE 1, showing in detail the transverse and longitudinal V-grooves on the sidewall;

FIGURE 4 is a sectional view taken along line 4—4 of FIGURE 3; and

FIGURE 5 is a sectional view taken along line 5—5 of FIGURE 3.

As shown in the drawings, an inflatabble fender 1 is secured to a boat 2 by rope 3, fastened through integral tabs 4 which are disposed on side surface 5, and on two end surfaces 6 of the fender 1. As can be seen in FIGURE 1, the fender 1 is held against the gunwale 7 of the boat 2 in normal usage.

The fender 1 is a generally elongated, inflated tubular member, fabricated from plastic, or some similar flexible material. In addition to the side surface 5 and the end surface 6, which carry the integral tabs 4, there are three additional elongated side surfaces 8, 9, and 10, and an end surface 11. Surfaces 8 and 11 are plain, but the surfaces 9 and 10 are modified as shown in the drawings.

The side surface 9 is formed with a plurality of V-grooves 12 which extend both longitudinally and transversely along the surface 9, as can be seen in FIGURES 2–5 of the drawings. The longitudinal grooves 12 are intended for nesting around the gunwale 2 to hold the fender 1 against shifting up or down relative to the gunwale 2, as shown in FIGURE 1. Alternatively, the fender 1 can be positioned as shown in FIGURE 2 of the drawings with the transverse V-groove 12 engaging and partly surrounding the gunwale 2. As best seen in FIGURE 1, a plurality of longitudinal ribs 13 are disposed on the side surface 10 of the fender 1 for reducing the frictional contact with the mooring surface. As shown in FIGURES 4 and 5 a needle valve opening 14 is provided on the end surface 6 for deflating and inflating the fender 1 by means of any conventional air pump.

Various modes of carrying out the invention are contemplated as being within the scope of the following claims, particularly pointing out and distinctly claiming the subject matter which is regarded as invention:

I claim:

1. A pneumatic boat fender comprising a tubular body fabricated from flexible material and having integral rope-receiving eyelets formed therein for securing the fender to the gunwale of a boat, a surface including an integral concave groove for engaging the gunwale and holding the fender in position relative to the gunwale, and an integral, corrugated surface opposite the surface bearing the concave groove to provide minimum frictional engagement with a mooring surface against which the boat is moored to thereby allow the fender to ride up and down with respect to the mooring surface and to remain in fixed position relative to the gunwale of the boat.

2. The boat fender of claim 1, in which the tubular body is elongated, and the groove extends longitudinally along one of the elongated surfaces thereof.

3. The boat fender of claim 1, in which the tubular body is elongated, and the groove extends transversely across one of the elongated surfaces thereof.

4. The boat fender of claim 1, including a plurality of parallel grooves extending along one surface of the tubular body to provide a plurality of positions by which said fender can be disposed against the gunwale of a boat.

5. The boat fender of claim 1, including at least a second groove transecting the concave groove to allow ninety degree rotation of the fender by engaging the gunwale with the second groove.

6. The boat fender of claim 1, including valve means for inflating and deflating the tubular body to adjust the resiliency of the fender and to facilitate storage.

References Cited

UNITED STATES PATENTS

| | | | |
|---|---|---|---|
| 3,013,516 | 12/1961 | Norman | 114—219 |
| 3,145,686 | 8/1964 | Blythe | 114—219 |
| 3,183,875 | 5/1965 | Russell | 114—219 |

MILTON BUCHLER, Primary Examiner

JAMES E. PITTENGER, Assistant Examiner

U.S. Cl. X.R.

61—48